United States Patent
Morita

(10) Patent No.: US 10,782,761 B2
(45) Date of Patent: Sep. 22, 2020

(54) POWER TRANSMISSION AND RECEPTION CONTROL DEVICE, POWER TRANSMISSION AND RECEPTION CONTROL METHOD, COMPUTER PROGRAM, AND INPUT AND OUTPUT CONTROL DEVICE

(71) Applicant: Sony Corporation, Tokyo (JP)

(72) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 15/580,326

(22) PCT Filed: May 19, 2016

(86) PCT No.: PCT/JP2016/064827
§ 371 (c)(1),
(2) Date: Dec. 7, 2017

(87) PCT Pub. No.: WO2016/203898
PCT Pub. Date: Dec. 22, 2016

(65) Prior Publication Data
US 2018/0224914 A1    Aug. 9, 2018

(30) Foreign Application Priority Data

Jun. 16, 2015   (JP) ................. 2015-121220

(51) Int. Cl.
*G06F 1/30*        (2006.01)
*H02J 3/00*        (2006.01)
(Continued)

(52) U.S. Cl.
CPC ............... *G06F 1/30* (2013.01); *G06F 1/26* (2013.01); *H02J 1/00* (2013.01); *H02J 1/08* (2013.01);
(Continued)

(58) Field of Classification Search
CPC ........................................ G06F 1/30
See application file for complete search history.

(56) References Cited

U.S. PATENT DOCUMENTS 9,543,763 B2   1/2017  Sako et al.
10,158,228 B2  12/2018 Kawamoto et al.
(Continued)

FOREIGN PATENT DOCUMENTS

JP    2011-205871 A    10/2011
JP    2013-090560 A     5/2013
(Continued)

OTHER PUBLICATIONS

International Search Report and English translation thereof dated Jul. 26, 2016 in connection with International Application No. PCT/JP2016/064827.
(Continued)

*Primary Examiner* — Daniel J Cavallari
(74) *Attorney, Agent, or Firm* — Wolf, Greenfield & Sacks, P.C.

(57) ABSTRACT

[Object] To provide a power transmission and reception control device configured to check whether another consumer is controlling a direct-current bus line when interchanging direct-current power.
[Solution] Provided is a power transmission and reception control device including: a power transmission and reception control unit configured to control transmission and reception of direct-current power over a direct-current power line through a DC-to-DC converter connected to the direct-current power line; a power transmission and reception management unit configured to request the power transmission and reception control unit to control the DC-to-DC converter; and a power transmission and reception arbitration unit configured to request the power transmission and reception management unit to perform transmission and
(Continued)

reception of power through the DC-to-DC converter. When the power transmission and reception arbitration unit instructs the power transmission and reception management unit to set voltage to the direct-current power line, the power transmission and reception management unit causes the power transmission and reception control unit to set the voltage to the direct-current power line a predetermined number of times by using a random number, and if voltage and current of the direct-current power line are set values, the power transmission and reception management unit instructs the power transmission and reception arbitration unit to acquire a control right of the direct-current power line.

11 Claims, 7 Drawing Sheets

(51) Int. Cl.
  *G06F 1/26* (2006.01)
  *H02J 13/00* (2006.01)
  *H02J 1/00* (2006.01)
  *H02J 1/08* (2006.01)
  *H04B 3/54* (2006.01)

(52) U.S. Cl.
  CPC ............... *H02J 3/00* (2013.01); *H02J 13/00* (2013.01); *H02J 13/0003* (2013.01); *H04B 3/54* (2013.01)

(56) References Cited

U.S. PATENT DOCUMENTS

| | | |
|---|---|---|
| 2013/0138256 A1 | 5/2013 | Sako et al. |
| 2015/0124501 A1* | 5/2015 | Dermark ............... H02J 3/381 363/65 |
| 2016/0329744 A1 | 11/2016 | Werth et al. |
| 2017/0163051 A1 | 6/2017 | Morita et al. |
| 2017/0229861 A1 | 8/2017 | Kawamoto et al. |
| 2017/0373510 A1 | 12/2017 | Morita |
| 2018/0278083 A1 | 9/2018 | Andre et al. |

FOREIGN PATENT DOCUMENTS

| | | |
|---|---|---|
| JP | 2014-161199 A | 9/2014 |
| WO | WO 2015-072304 A1 | 5/2015 |

OTHER PUBLICATIONS

Written Opinion and English translation thereof dated Jul. 26, 2016 in connection with International Application No. PCT/JP2016/064827.

International Preliminary Report on Patentability and English translation thereof dated Dec. 28, 2017 in connection with International Application No. PCT/JP2016/064827.

\* cited by examiner

POWER TRANSMISSION AND RECEPTION
CONTROL DEVICE, POWER
TRANSMISSION AND RECEPTION
CONTROL METHOD, COMPUTER
PROGRAM, AND INPUT AND OUTPUT
CONTROL DEVICE

CROSS REFERENCE TO RELATED
APPLICATIONS

This is a U.S. National Stage Application under 35 U.S.C. § 371, based on International Application No. PCT/JP2016/064827, filed May 19, 2016, which claims priority to Japanese Patent Application JP 2015-121220, filed Jun. 16, 2015, each of which is hereby incorporated by reference in its entirety.

TECHNICAL FIELD

The present disclosure relates to power transmission and reception control devices, power transmission and reception control methods, computer programs, and input and output control devices.

BACKGROUND ART

There is known an uninterruptible power supply provided with a storage battery for continuing to provide power from the storage battery to equipment connected thereto for a predetermined time without causing power failure even when the power from an input power source is interrupted. Techniques are developed for extending such a power supply into each consumer and supplying power to the consumers when an abnormality occurs in supplying power due to power failure, shortage of storage battery capacity, or other reasons (see Patent Literature 1 and Patent Literature 2).

CITATION LIST

Patent Literature

Patent Literature 1: JP 2011-205871A
Patent Literature 2: JP 2013-90560A

DISCLOSURE OF INVENTION

Technical Problem

When consumers supply power to each other, it is desirable, for the sake of efficiency, to supply direct-current power in consideration of supply of power from a storage battery. However, if a consumer transmits direct-current power without any permission or instruction, the power will not be properly transmitted to a target receiver of power. Thus, it is desirable to efficiently manage the right to control the transmission and reception of direct-current power. In addition, when acquiring a control right, it is desirable to check whether another consumer is transmitting or receiving direct-current power.

Therefore, according to the present disclosure, there is provided a novel and improved power transmission and reception control device, power transmission and reception control method, computer program, and input and output control device that are capable of efficiently managing the right to control interchange of a common source such as direct-current power after checking whether another consumer is controlling a common medium such as a direct-current bus line, when interchanging the common source such as direct-current power.

Solution to Problem

According to the present disclosure, there is provided a power transmission and reception control device including: a power transmission and reception control unit configured to control transmission and reception of direct-current power over a direct-current power line through a DC-to-DC converter connected to the direct-current power line; a power transmission and reception management unit configured to request the power transmission and reception control unit to control the DC-to-DC converter; and a power transmission and reception arbitration unit configured to request the power transmission and reception management unit to perform transmission and reception of power through the DC-to-DC converter. When the power transmission and reception arbitration unit instructs the power transmission and reception management unit to set voltage to the direct-current power line, the power transmission and reception management unit causes the power transmission and reception control unit to set the voltage to the direct-current power line a predetermined number of times by using a random number, and if voltage and current of the direct-current power line are set values, the power transmission and reception management unit instructs the power transmission and reception arbitration unit to acquire a control right of the direct-current power line.

In addition, according to the present disclosure, there is provided a power transmission and reception control method including: instructing to set voltage to a direct-current power line; causing a DC-to-DC converter connected to the direct-current power line to set voltage to the direct-current power line a predetermined number of times in response to the instruction by using a random number; and instructing to acquire a control right of the direct-current power line if voltage and current of the direct-current power line are set values.

In addition, according to the present disclosure, there is provided a computer program causing a computer to execute: instructing to set voltage to a direct-current power line; causing a DC-to-DC converter connected to the direct-current power line to set voltage to the direct-current power line a predetermined number of times in response to the instruction by using a random number; and instructing to acquire a control right of the direct-current power line if voltage and current of the direct-current power line are set values.

In addition, according to the present disclosure, there is provided an input and output control device including: an input and output control unit configured to control input/output of a predetermined target through a medium common with another area; an input and output management unit configured to request the input and output control unit to control input/output of the predetermined target from/to the common medium; and an input and output arbitration unit configured to request the input and output management unit to perform input/output through the input and output control unit. When the input and output arbitration unit instructs the input and output management unit to set output of the predetermined target to the common medium, the input and output management unit causes the input and output control unit to output the predetermined target to the common medium a predetermined number of times by using a random number, and if the predetermined target output to the common medium is a value set at the time of the output, the input and output management unit instructs the input and output arbitration unit to acquire a control right of input/output of the predetermined target from/to the common medium.

Advantageous Effects of Invention

As described above, according to the present disclosure, it is possible to provide the novel and improved power transmission and reception control device, power transmission and reception control method, and computer program that are capable of efficiently managing the right to control interchange of a common source such as direct-current power after checking whether another consumer is controlling a common medium such as a direct-current bus line, when interchanging the common source such as direct-current power.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is a flowchart illustrating an operation example of a battery server 100a.

FIG. 5 is a flowchart illustrating the operation example of the battery server 100a.

FIG. 6 is an explanatory diagram illustrating a detailed example of operation performed by the battery server 100a.

MODE(S) FOR CARRYING OUT THE INVENTION

Figure 1:
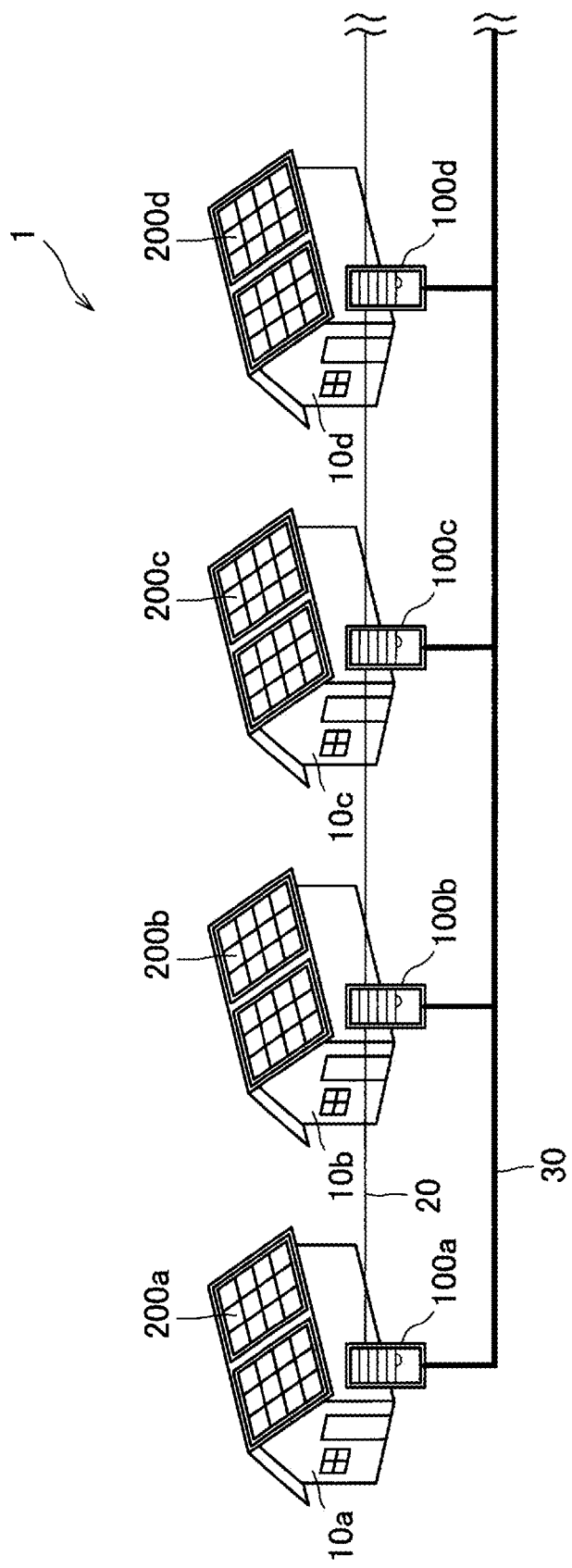
FIG. 1 is an explanatory diagram illustrating an overall configuration example of a power transmission and reception control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, the description will be made in the following order.
1. Embodiment of present disclosure
1.1. Overview
1.2. System configuration example
1.3. Operation example
2. Conclusion 1. Embodiment of Present Disclosure 1.1. Overview An overview of an embodiment of the present disclosure will be described prior to description of the embodiment of the present disclosure.

It is assumed that an environment becomes increasingly popular in which each consumer is provided with a battery server having a storage battery, the storage battery stores power using a commercial power supply or power generated from a natural energy source such as solar, wind, and geothermal, and the power stored in the storage battery drives electrical appliances. With the spread of such environment, a power interchange system is designed for interchanging power between consumers, as described above. When power is insufficient in a battery server of a consumer, the power interchange system allows a battery server of a consumer having extra power to supply power to the battery server of the consumer having insufficient power. When consumers supply power to each other, it is preferable, for the sake of efficiency, to supply direct-current power in consideration of the supply of power from a storage battery.

However, if consumers transmit direct-current power from their battery servers without any permission or instruction, the power will not be properly transmitted to a target receiver of power. Thus, it is desirable to manage the right to control the transmission and reception of direct-current power to and from a battery server. From the point of view of management of the control right, there is considered a method of mutually interchanging the direct-current power among consumers by sharing the roles of a battery server between a master and a slave. The master controls operations of all of the battery servers connected to a direct-current power grid that transmits direct-current power from a consumer, and a slave is operated in accordance with the instructions of the master.

The battery server acting as a master sets a voltage of a direct-current power grid, and transmits direct-current power from the master or requests a slave to transmit direct-current power, thereby transmitting direct-current power to a target receiver of power. When roles are shared between a master and a slave in this way, for example, there is considered a method of allowing a battery server acting as a master to be set to always keep its role as a master, or setting a battery server that first responds to a request from a consumer in which the power is insufficient, as a master.

However, if a battery server acting as a master is set to always keep its role as a master, a load is concentrated on the battery server, thereby causing an imbalance. In addition, when the battery server acting as the master is stopped for any reason, the transmission and reception of direct-current power between consumers will be not allowed. In addition, after a battery server acting as a master requests a battery server acting as a slave to transmit power to the battery server acting as a master, if the slave stops transmitting power and starts receiving power for reasons such as a change in the mind of the user of the consumer of the slave in spite of a promise to transmit power by the slave, it is considered that there is a situation where the slave which has started receiving power may take the stored power from the battery server acting as a master, or the voltage of the direct-current power grid may vary significantly.

In addition, when a battery server acting as a master is requested to transmit and receive power between battery servers acting as a slave, if the battery server acting as a slave changes the amount of power transmission or reception, or switches from power transmission to power reception, for reasons such as a change in the user's mind similarly as described above, it is considered that there is a situation where the battery server acting as a master should take responsibility for the difference caused by the change or switching, and thus a significant load may be applied to the battery server acting as the master.

In addition, when a battery server acting as a slave is stopped for reasons such as failure, if a battery server acting as a master does not recognize the stop, it is considered that there is a situation where an instruction to the slave is made unable to function and thus it will no longer be able to control the direct-current power grid, or the stored power may be taken from the battery server acting as a master.

In addition, when the grid is connected with a device, which is not authorized for connection or is not intended to be connected thereto, the device is not under the control of a master, and thus it is considered that there is a situation where the device transmits/receives power to/from the grid without any permission or sends a control command to other battery servers without being asked for it, thereby throwing the grid into confusion.

In addition, when the user of each battery server wants to find out the states of all devices connected to the grid, if each battery server sends a request for information to a network individually, it may be considered that there is a situation where the network is in congestion thereby causing problems with appropriate operations of the system.

The present inventors have made extensive studies to achieve a technology capable of managing efficiently the right to control the transmission and reception of direct-current power while avoiding the occurrence of situations as described above. As a result, the present inventors have arrived at the technology capable of efficiently managing the control right to control transmission and reception of direct-current power after checking whether another consumer is transmitting or receiving direct-current power while avoiding occurrence of the above described situations.

The overview of the embodiment of the present disclosure has been described. Next, a functional configuration example of the power transmission and reception control system according to the embodiment of the present disclosure will be described.

1.2. System Configuration Example

FIG. 1 is an explanatory diagram illustrating an overall configuration example of the power transmission and reception control system according to the embodiment of the present disclosure. FIG. 1 illustrates the overall configuration example of the power transmission and reception control system that interchanges direct-current power between battery servers each of which has a storage battery. Hereinafter, the overall configuration example of the power transmission and reception control system according to the embodiment of the present disclosure will be described with reference to FIG. 1.

As illustrated in FIG. 1, a power transmission and reception control system 1 is constructed to mutually supply direct-current power as necessary through a DC grid (HVDC) among battery servers provided in the respective consumers (four consumers are illustrated in FIG. 1). A consumer 10a is provided with a battery server 100a. Similarly, a consumer 10b, a consumer 10c, and a consumer 10d are provided with a battery server 100b, a battery server 100c, and a battery server 100d, respectively. Each of the battery servers 100a to 100d has a rechargeable battery provided inside or outside of each battery server.

In addition, the battery servers 100a to 100d are connected to a direct-current bus line 20 over which direct-current power is mutually supplied among the battery servers as necessary. Each of the battery servers 100a to 100d is provided with a bidirectional DC-to-DC converter that converts voltage of a battery and voltage of the direct-current bus line 20. In addition, the battery servers 100a to 100d are connected to a communication wire 30. When the battery servers 100a to 100d mutually supply direct-current power over the direct-current bus line 20, the battery servers 100a to 100d transmit and receive information over the communication wire 30. The communication wire 30 is illustrated as being actually wired in FIG. 1, but the communication wire 30 may be wireless.

The consumers 10a to 10d may be provided with solar panels 200a to 200d, respectively. Each of the solar panels 200a to 200d receives radiation of sunlight and generates electric power. The solar panels 200a to 200d are configured such that the generated electric power may be stored in the respective batteries provided in the battery servers 100a to 100d. Note that, the electric power stored in the battery servers 100a to 100d may be generated by natural energy, such as wind or geothermal, other than sunlight.

In addition, the power transmission and reception control system 1 according to the embodiment is characterized by a mechanism for arbitrating power transmission and reception among the battery servers 100a to 100d in such a way that only one of the battery servers 100a to 100d connected to the direct-current bus line 20 has the right to control the transmission and reception of direct-current power over the direct-current bus line 20. In other words, the power transmission and reception control system 1 according to the embodiment is configured to have a mechanism that allows only a battery server having the control right among the battery servers 100a to 100d to instruct other battery servers to transmit power stored in their own batteries or to receive power for charging their own batteries, and that prevents the battery servers having no control right from performing the power transmission and reception without permission or instruction.

In this way, only one of the battery servers 100a to 100d connected to the direct-current bus line 20 has the right to control the transmission and reception of direct-current power to and from other battery servers over the direct-current bus line 20. This makes it possible for the power transmission and reception control system 1 according to the embodiment to avoid situations caused when the roles are simply shared between a master and a slave as described above and to efficiently manage the right to control the transmission and reception of direct-current power. In addition, the power transmission and reception control system 1 according to the embodiment efficiently manages the right to control the transmission and reception of direct-current power, thereby keeping the order of targets to be controlled among the battery servers.

Note that, it is possible to efficiently manage the right to control transmission and reception of direct-current power if all battery servers connected to the direct-current bus line 20 are connected over the communication wire 30 as illustrated in FIG. 1. However, for example, in the case where there is a battery server that is connected to the direct-current bus line 20 but not connected to the other battery servers over the communication wire 30, the battery server may throw operation of the other battery servers into confusion when the battery server sets voltage to the direct-current bus line 20 without any permission, when the battery server receives power from the direct-current bus line 20 without any permission, or when the battery server transmits power to the direct-current bus line 20 without any permission.

Accordingly, each of the battery servers that constitute the power transmission and reception control system according to the embodiment of the present disclosure checks whether there is a device that is setting voltage to the direct-current bus line 20 or transmitting/receiving power over the direct-current bus line 20 when acquiring the control right and controlling transmission and reception of power through the direct-current bus line 20, as described below. If there is not another device that is setting voltage to the direct-current bus line 20 or transmitting/receiving power over the direct-current bus line 20, the battery server formally acquires the control right and control transmission and reception of power through the direct-current bus line 20. On the other hand, if there is another device that is setting voltage to the direct-current bus line 20 or transmitting/receiving power over the direct-current bus line 20, it is considered that the another device may try to acquire another control right to perform control. Therefore, the battery server stands by for a predetermined time and then again check whether there is the another device that is setting voltage to the direct-current bus line 20 or transmitting/receiving power over the direct-current bus line 20. In the case where it is confirmed a predetermined number of times that there is another device that is setting voltage to the direct-current bus line 20 or transmitting/receiving power over the direct-current bus line 20, this results in a control right acquisition error.

By performing the above described operation, the battery servers that constitute the power transmission and reception control system according to the embodiment of the present disclosure enable one of the battery servers connected to the direct-current bus line 20 to surely acquire the control right and control transmission and reception of power through the direct-current bus line 20.

The overall configuration example of the power transmission and reception control system according to the embodiment of the present disclosure has been described with reference to FIG. 1. Subsequently, a functional configuration example of the power transmission and reception control system according to the embodiment of the present disclosure will be described.

Figure 2:
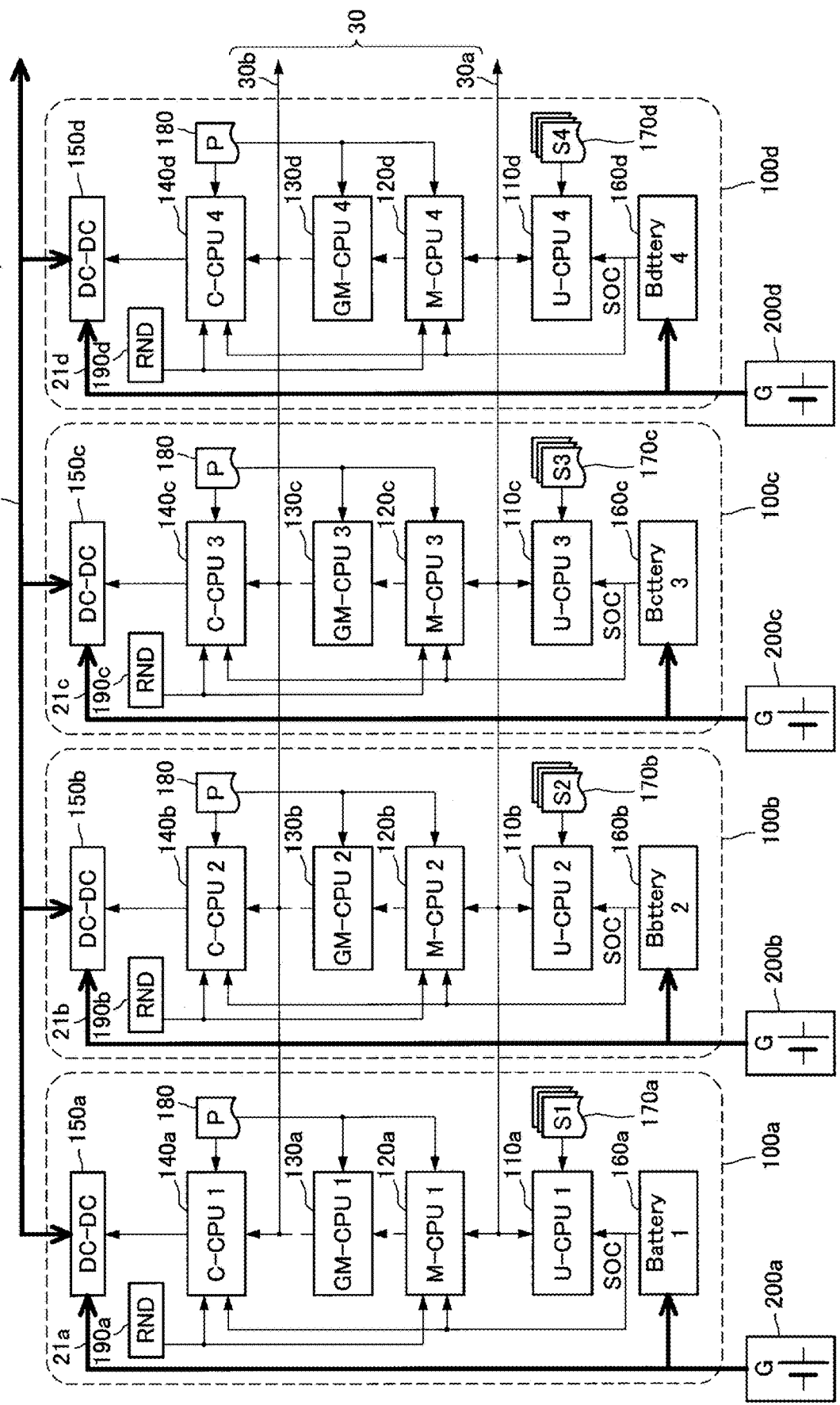
FIG. 2 is an explanatory diagram illustrating a functional configuration example of the power transmission and reception control system according to the embodiment of the present disclosure.

FIG. 2 is an explanatory diagram illustrating a functional configuration example of the power transmission and reception control system according to the embodiment of the present disclosure. Hereinafter, the functional configuration example of the power transmission and reception control system according to the embodiment of the present disclosure will be described with reference to FIG. 2.

As illustrated in FIG. 2, the battery server 100a is configured to include a U-CPU 110a, an M-CPU 120a, a GM-CPU 130a, a C-CPU 140a, a DC-to-DC converter 150a, and a battery 160a, and a random number generator (RND) 190a. The battery servers 100b, 100c, and 100d each have a configuration similar to the battery server 100a. Next, the structural elements that constitute the battery server 100a will be described.

As illustrated in FIG. 2, the communication wire 30 is composed of two paths (channels) including a communication wire 30a and a communication wire 30b. The communication wires 30a and 30b may be physically different wired communication wires, or may be physically identical wired or wireless communication wires, which are different from each other logically in authentication, encryption, or the like. As illustrated in FIG. 2, the communication wire 30a allows the U-CPU 110a to communicate with other U-CPUs 110b to 110d, and the M-CPU 120a to communicate with other M-CPUs 120b to 120d. The communication wire 30b allows the GM-CPU 130a to communicate with other GM-CPUs 130b to 130d, and the C-CPU 140a to communicate with other C-CPUs 140b to 140d.

The power transmission and reception control system 1 according to the embodiment uses separate communication paths for the U-CPU 110a and the M-CPU 120a and for the GM-CPU 130a and the C-CPU 140a. As a result, the U-CPU 110a and the M-CPU 120a are prevented from directly sending an instruction to the GM-CPU 130a and the C-CPU 140a. In addition, the GM-CPU 130a and the C-CPU 140a are also prevented from directly sending an instruction to the U-CPU 110a and the M-CPU 120a.

The U-CPU 110a is an example of a power transmission and reception requesting unit according to the present disclosure. The U-CPU 110a periodically checks the state of charge (SOC) in the battery 160a. Subsequently, if the state of charge in the battery 160a satisfies a predetermined condition, the U-CPU 110a requests the M-CPU 120a to receive power. The request to be sent from the U-CPU 110a to the M-CPU 120a may include a voltage value or current value upon reception of power, a time for receiving power (e.g., start time, end time, and duration), a state of charge in the battery 160a that stops receiving power, and the like.

The U-CPU 110a refers to a scenario 170a to determine whether the state of charge in the battery 160a satisfies a predetermined condition. The scenario 170a describes a condition of the state of charge in the battery 160a, which is used by the U-CPU 110a requesting the M-CPU 120a to receive power. The condition described in the scenario 170a may be that the U-CPU 110a requests the M-CPU 120a to receive power if the state of charge in the battery 160a is lower than or equal to 20%, for example.

The U-CPU 110a may have a function that edits contents of the scenario 170a on the basis of the request from the user. The contents of the scenario 170a may be described in text, a markup language such as extensible markup language (XML), or a scripting language such as Lisp, Perl, and PHP, for example. When the contents of the scenario 170a are described in a scripting language, the contents of the scenario 170a may be described as a set of functions.

In addition, for example, the scenario 170a may be edited using a text editor, a dedicated editor, or a web browser. The U-CPU 110a may be configured such that a tool capable of editing the contents of the scenario 170a is operable.

In addition, when another battery server issues a request for supply of power, the scenario 170a may describe a condition for permitting power transmission in response to the request. For example, when another battery server issues a request for supply of power, the scenario 170a may describe a condition that power transmission is permitted in response to the request if the state of charge in the battery 160a is greater than or equal to 80%. In addition, for example, when another battery server a request for supply of power, the scenario 170a may describe a condition that power transmission is permitted in response to the request if the state of charge in the battery 160a is greater than or equal to 80% and the usage rate of the power per hour is less than or equal to 10%. In other words, the conditions described in the scenario 170a may include not only the state of charge in the battery 160a but also the state of usage of electric power stored in the battery 160a.

The contents of the scenario are possible to be defined independently at the respective batteries. Accordingly, the condition for requesting power reception or the condition for permitting power transmission in response to a request for supply of power from another battery server may be different for each battery server. The number of scenarios to be defined at each battery server is not limited to only one. The scenario referred to by the U-CPU 110a may be switched into another scenario, depending on the situation.

The M-CPU 120a is an example of a power transmission and reception arbitration unit according to the present disclosure. When the M-CPU 120a receives a request for power reception from the U-CPU 110a, the M-CPU 120a inquires of the M-CPUs 120b, 120c, and 120d of other battery servers about whether they are allowed to transmit power by performing communication with the M-CPUs 120b, 120c, and 120d via the communication wire 30a. In addition, when the M-CPU 120a receives an inquiry about whether the M-CPU 120a is capable of transmitting power from the M-CPUs 120b, 120c, and 120d of other battery servers, the M-CPU 120a responds whether power transmission is possible or not.

In addition, when the M-CPU 120a receives an inquiry from the M-CPUs 120b, 120c, and 120d of other battery servers as to whether the M-CPU 120a is capable of transmitting power, the M-CPU 120a may respond that power transmission is possible. In this case, if the GM-CPU 130a is not in operation, the M-CPU 120a inquires of the M-CPUs 120b, 120c, and 120d of other battery servers about whether the GM-CPUs 130b, 130c, and 130d are in operation over the communication wire 30a. As will be described in detail later, the GM-CPU 130a is started on the basis of the start instruction from the M-CPU 120a and controls the operation of the DC-to-DC converters 150a to 150d of the respective battery servers.

In the power transmission and reception control system 1 according to the embodiment, only one of the GM-CPUs 130a to 130d is permitted to start. Thus, when the GM-CPU 130a is not started, the M-CPU 120a determines that the battery server 100a does not have the right to control the power transmission and reception and inquires of the M-CPUs 120b, 120c, and 120d of other battery servers about whether they have the right to control the power transmission and reception, that is, whether they are in operation or not, over the communication wire 30a. If there is a GM-CPU in operation, the M-CPU 120a requests the operating GM-CPU to transmit and receive power through the M-CPU that causes the GM-CPU to be in operation. For example, if the GM-CPU 130b is in operation, the M-CPU 120a requests the GM-CPU 120b to transmit and receive power through the M-CPU 120b.

On the other hand, if the M-CPUs 120b, 120c, and 120d of other battery servers has issued an inquiry about whether the power transmission is possible or not and a response saying that the power transmission is possible is made, a response saying that the GM-CPU 130a is in operation is also made when the GM-CPU 130a is in operation.

The M-CPU 120a notifies the C-CPU 140a that the C-CPU 140a should follow an instruction only from a GM-CPU of the battery server having the control right. For example, the M-CPU 120a notifies the C-CPU 140a of identification information for identifying a GM-CPU of the battery server having the control right. When the C-CPU 140a receives the notification of identification information for identifying a GM-CPU of the battery server having the control right, the C-CPU 140a can ignore an instruction from a GM-CPU that contains identification information other than the identification information.

In the case where it is recognized that another battery server is trying to acquire the control right at the same timing, the M-CPU 120a sets a standby time by using a random number generated by the random number generator 190a, and starts the control right acquisition process again after the standby time has elapsed.

The GM-CPU 130a is an example of a power transmission and reception management unit according to the present disclosure. The GM-CPU 130a is started and activated according to a start instruction from the M-CPU 120a. On the other hand, the GM-CPU 130a is stopped and deactivated according to a stop instruction from the M-CPU 120a. The activated GM-CPU 130a controls the power transmission and reception performed by the DC-to-DC converters 150a to 150d through the C-CPUs 140a to 140d over the communication wire 30b on the basis of the request for the power transmission and reception from the M-CPUs 120a to 120d. When the requested power transmission and reception is all ended, the GM-CPU 130a performs a process for releasing the control right. When the control right is released, the GM-CPU 130a is stopped and deactivated according to the stop instruction from the M-CPU 120a.

When the M-CPUs 120a to 120d has issued a request for the power transmission and reception, the GM-CPU 130a acquires the power transmission capacity and power reception capacity of the respective battery servers 100a to 100d from the C-CPUs 140a to 140d over the communication wire 30b. In addition, the GM-CPU 130a also calculates an amount of electric current that can be transmitted, from the total transmission current amount of the direct-current bus line 20. When the accumulated power transmission amount reaches a requested power transmission amount after power transmission is started, the GM-CPU 130a instructs the C-CPUs 140a to 140d to stop transmitting power over the communication wire 30b.

The C-CPU 140a is an example of a power transmission and reception control unit according to the present disclosure. The C-CPU 140a controls the DC-to-DC converter 150a on the basis of an instruction from the activated GM-CPU (i.e. GM-CPU having the control right) among the GM-CPUs 130a to 130d. The C-CPU 140a receives the notification from the M-CPU 120a to follow the instruction only from the GM-CPU of the battery server having the control right. Thus, the C-CPU 140a controls the DC-to-DC converter 150a according to the instruction only from the GM-CPU of the battery server having the control right. It is possible for the C-CPU 140a to control charge and discharge of the battery 160a through the DC-to-DC converter 150a by controlling the DC-to-DC converter 150a.

The C-CPU 140a periodically checks a parameter of the DC-to-DC converter 150a, and warns a target transmitter or receiver of power upon occurrence of an abnormality in a parameter of the DC-to-DC converter 150a.

The DC-to-DC converter 150a is connected to the battery 160a and the solar panel 200a over a local bus line 21a, and is connected to the DC-to-DC converters 150b to 150d of the other battery servers 100b to 100d over the direct-current bus line 20. The DC-to-DC converter 150a converts a direct-current power between the direct-current bus line 20 and the local bus line 21a under the control of the C-CPU 140a.

The U-CPU 110a operates according to the scenario 170a defined independently in the respective battery servers 100a to 100d. The M-CPU 120a, the GM-CPU 130a, and the C-CPU 140a operate according to a common policy 180 to all of the battery servers 100a to 100d. Thus, the M-CPU 120a, the GM-CPU 130a, and the C-CPU 140a are not allowed to operate according to different rules of the other battery servers 100b to 100d.

For example, the contents of the policy 180 may be described in a text, a markup language such as extensible markup language (XML), or a scripting language such as Lisp, Perl, and PHP. When the contents of the policy 180 are described in a scripting language, the contents of the policy 180 may be described as a set of functions.

In addition, for example, the policy 180 may be edited using a text editor, a dedicated editor, or a web browser. As described above, the common policy 180 is referred to by all of the battery servers 100a to 100d, and thus it is desirable that the user is unable to edit easily, but sometimes the common policy 180 is edited as necessary. The M-CPU 120a, the GM-CPU 130a, or the C-CPU 140a may edit the policy 180 on the basis of the rule defined in the policy 180.

Examples of the contents described in the scenario 170a may include the following:
  SOC level to request supply of power
  SOC level to determine that power supply is possible
  Method of predicting and calculating battery residual amount from power consumption cycle in a day
  Method of predicting and calculating power generation amount in a week depending on acquisition of weather information
  Calculation of reduction in AC power usage depending on power interchange Examples of the contents described in the policy 180 may include a document version, date of modification, rule in modifying described contents, and respective rules defined for the M-CPUs 120a to 120d, the GM-CPUs 130a to 130d, and the C-CPUs 140a to 140d.

Examples of rules defined for the M-CPUs 120a to 120d may include the following:
  Determination condition and decision procedure for acquiring control right
  Decision procedure for objection from other devices
  Procedure of checking survival of battery server joined in the power transmission and reception control system 1
  Procedure of deleting registration of battery server previously joined in the power transmission and reception control system 1
  List and authentication information of members joined in the power transmission and reception control system 1

Examples of the determination condition for acquiring the control right may include a condition that a control right can be acquired if there is at least one M-CPU that is in favor of the acquisition and a condition that a control right can be acquired if a majority is in favor of the acquisition. Examples of the decision procedure for acquiring the control right may include a decision procedure in which a command is broadcasted to other M-CPUs to acquire the control right and it is determined whether acquisition the control right is possible on the basis of the response from another M-CPU that has returned an answer within a predetermined time. Similarly, examples of the decision procedure for objection from other devices may include a decision procedure in which a command is transmitted to other M-CPUs to acquire the control right and it is determined whether acquisition of the control right is possible on the basis of the contents of the objection from another M-CPU that has returned an answer within a predetermined time.

Examples of the procedure of checking survival of a battery server joined in the power transmission and reception control system 1 may include an example where an M-CPU of a battery server which is the last one that has acquired the control right checks whether other battery servers are survived.

Examples of the procedure of deleting registration of a battery server previously joined in the power transmission and reception control system 1 may include a procedure of deleting registration information described in the policy 180 on the basis of the command for requesting the deletion.

The list and authentication information of members joined in the power transmission and reception control system 1 are described in the policy 180, and thus the M-CPU can transmit various command only to the joined members and can add authentication information when transmitting the command. Examples of the authentication information of a member may include address information of each battery server and an authentication key that is common to the battery servers.

Examples of rules defined for the GM-CPUs 130a to 130d may include the following:
  Information on connection state of battery servers as viewed from their position
  Method of calculating current capacity on the basis of information on connection state of each battery server
  Control procedure and limitations of DC-DC converter
  Procedure from start to end of power transmission and reception to and from each battery server
  Abandonment or transfer procedure of control right after supply of power is stopped
  Processing procedure when notification of abnormality is issued The direct-current power flows in the direct-current bus line 20, and thus the GM-CPUs 130a to 130d are necessary to know the connection state of the battery servers 100a to 100d to the direct-current bus line 20 and to determine how to supply power on the basis of position information of the battery servers 100a to 100d. The connection states of the battery servers 100a to 100d to the direct-current bus line 20 are described in the policy 180, and thus the GM-CPUs 130a to 130d refer to the connection states to control the DC-to-DC converters 150a to 150d.

Examples of the procedure of controlling a DC-to-DC converter may include contents or the like of an instruction sent to the DC-to-DC converter when direct-current power is converted. Examples of the limitations of the DC-to-DC converter may include a range in which power can be converted.

Examples of the procedure from start to end of power transmission and reception to and from each battery server may include a procedure of increasing electric current at the start of the power transmission or reception, and a procedure of decreasing electric current at the end of the power transmission or reception.

Examples of the abandonment or transfer procedure of a control right after supply of power is stopped may include a procedure in which, for example, if there is another battery server that is supplying power, the control right is transferred to the another battery server.

Examples of the processing procedure when notification of abnormality is issued may include a procedure in which, if a battery server has a failure, the failed battery server is ignored and the processing proceeds.

Examples of rules defined for the C-CPUs 140a to 140d may include the following:
  Procedure of checking whether control performed by GM-CPU of battery server having the control right is continued m and abnormality processing procedure
  Procedure of checking whether plurality of GM-CPUs are performing control simultaneously
  Processing procedure when plurality of GM-CPUs are performing control simultaneously
  Monitoring procedure of checking operations of DC-to-DC converter and appropriately notifying of GM-CPU of battery server having control right Examples of the procedure of checking whether control performed by a GM-CPU of a battery server having the control right is continued may include a procedure of checking whether the GM-CPU starts control at predetermined time intervals. Examples of the abnormality processing procedure may include a procedure of notifying the GM-CPU of a battery server having a control right that control performed by the GM-CPU is interrupted for more than a predetermined time.

Examples of the procedure of checking whether a plurality of GM-CPUs are performing control simultaneously may include a procedure of checking whether a GM-CPU having identification information different from the identification information notified from the M-CPU is performing control. Examples of the processing procedure when the plurality of GM-CPUs are performing control simultaneously may include a procedure of ignoring the control performed by the GM-CPU having identification information different from the identification information notified from the M-CPU and notifying a GM-CPU of a battery server having the control right that the plurality of GM-CPUs are performing control simultaneously by dealing with the control performed by all of the GM-CPUs as errors.

Examples of the monitoring procedure of checking operations of a DC-to-DC converter and appropriately notifying of a GM-CPU of a battery server having the control right may include a procedure of checking a parameter of the DC-to-DC converter at predetermined time intervals and notifying of the GM-CPU of the battery server having the control right of the parameter of the DC-to-DC converter.

The policy 180 defined as described above allows the C-CPUs 140a to 140d to send an instruction to stop transmitting and receiving power to the DC-to-DC converters 150a to 150d immediately when the instruction from the GM-CPU violates the contents of the policy 180.

Needless to say, the description contents of the scenario 170a or the policy 180 and examples of the description contents of the scenario 170a or the policy 180 are not limited to those described above. The description contents of the scenario 170a or the policy 180 may be appropriately changed depending on the configuration of the power transmission and reception control system 1 or the configuration of each of the battery servers 100a to 100d.

However, a battery server that has acquired the control right cannot control the direct-current bus line 20 appropriately when the battery server has acquired the control right through arbitration between battery servers but a device that does not take part in the arbitration is setting different voltage to the direct-current bus line 20 or transmitting/receiving power through the direct-current bus line 20. For example, when trying to set voltage to the direct-current bus line 20 and to transmit/receive power to/from a designated battery server, the battery server that has acquired the control right cannot control transmission and reception as planned in the case where there is another device that is setting different voltage to the direct-current bus line 20 or transmitting/receiving power through the direct-current bus line 20.

Therefore, when the GM-CPU 130a instructs the C-CPU 140a to acquire the control right, the C-CPU 140a controls the DC-to-DC converter 150a and sets voltage of the direct-current bus line 20. In this case, the C-CPU 140a decides a voltage value to be set on the direct-current bus line 20 by using a random number generated by the random number generator 190a. Subsequently, if the setting of the decided value on the voltage of the direct-current bus line 20 has succeeded, the C-CPU 140a determines that there is not another device that is setting another voltage to the direct-current bus line 20 or transmitting/receiving power through the direct-current bus line 20, and notifies the GM-CPU 130a thereof.

If the C-CPU 140a can set voltage of the direct-current bus line 20 a predetermined number of times in accordance with the decided value, the GM-CPU 130a determines that the battery server 100a has acquired the control right without any problem. When it is determined that the battery server 100a has acquired the control right without any problem, the GM-CPU 130a notifies the M-CPU 102a that the battery server 100a has acquired the control right without any problem. The M-CPU 120 notifies other battery servers of the acquisition of the control right without any problem.

The battery 160a is composed of a rechargeable secondary battery. The battery 160a may be charged with power generated by the solar panel 200a or power supplied from the commercial supply of power (not illustrated). The battery 160a may be charged with power supplied from other battery servers 100b to 100d as necessary. In addition, the power stored in the battery 160a may be supplied to electric appliances such as air conditioner, refrigerator, washing machine, television set, and microwave, provided in the consumer 10a. In addition, the power stored in the battery 160a may be supplied from the DC-to-DC converter 150a to other battery servers 100b to 100d depending on the request from the other battery servers 100b to 100d.

The random number generator 190a generates a random number. The random number generator 190a may be an authentic random number generator capable of generating perfect random values, or may be a generator capable of generating a random value on the basis of information unique to each battery server. The random number generated by the random number generator 190a is used by the M-CPU 120a or the C-CPU 140a.

The random number generated by the random number generator 190a is used for checking whether there is another device that is setting voltage to the direct-current bus line 20 or transmitting/receiving power through the direct-current bus line 20. The random number generated by the random number generator 190a is used for generating a voltage value to be set on the direct-current bus line 20 when checking whether there is another device that is setting voltage to the direct-current bus line 20 or transmitting/receiving power through the direct-current bus line 20. Details thereof will be described later. In addition, the random number generated by the random number generator 190a is used for generating a predetermined standby time when it is confirmed that there is another device that is setting voltage to the direct-current bus line 20 or transmitting/receiving power through the direct-current bus line 20.

The battery servers 100a to 100d according to the embodiment of the present disclosure have the configuration as illustrated in FIG. 2, and thus only one battery server among them having the control right can control power transmission and reception of direct-current power to and from other battery servers over the direct-current bus line 20. The battery servers 100a to 100d according to the embodiment of the present disclosure have the configuration as illustrated in FIG. 2, and thus it is possible to avoid situations caused when the roles are simply shared between a master and a slave as described above and to efficiently manage the right to control the power transmission and reception of direct-current power. In addition, the battery servers 100a to 100d according to the embodiment of the present disclosure have the configuration as illustrated in FIG. 2, and thus it is possible to efficiently manage the right to control the power transmission and reception of direct-current power, thereby keeping the order of targets to be controlled among the battery servers.

In addition, since the battery servers 100a to 100 constituting the power transmission and reception control system according to the embodiment of the present disclosure have the configuration illustrated in FIG. 2, the battery server that constitutes the power transmission and reception control system according to the embodiments according to the present disclosure enables one of battery servers connected to the direct-current bus line 20 to surely acquire the control right and control transmission and reception of power through the direct-current bus line 20.

In addition, since the battery servers 100a to 100 constituting the power transmission and reception control system according to the embodiment of the present disclosure have the configuration illustrated in FIG. 2, it is possible to check whether there is another device that is setting voltage to the direct-current bus line 20 or transmitting/receiving power through the direct-current bus line 20. Since the battery servers 100a to 100d have the configuration illustrated in FIG. 2, it is possible to surely check whether there is another device that is controlling the direct-current bus line 20 after acquiring the control right. Accordingly, it is possible to safely operate the DC grid.

Note that, the direct-current bus line 20 or the local bus lines 21a to 21d are not limited to the particular configuration. For example, the direct-current bus line 20 or the local bus lines 21a to 21d may be configured as a direct-current single-phase three-wire bus line having two lines for supplying positive voltage and negative voltage, and a line configured to be connected to the ground.

The functional configuration example of the power transmission and reception control system according to the embodiment of the present disclosure has been described with reference to FIG. 2. Next, an operation example of the power transmission and reception control system according to the embodiment of the present disclosure will be described.

1.3. Operation Example

First, the U-CPU 110a, the M-CPU 120a, the GM-CPU 130a, and the C-CPU 140a included in the battery server 100a according to the embodiment of the present disclosure will be described in an organized way.

Figure 3:
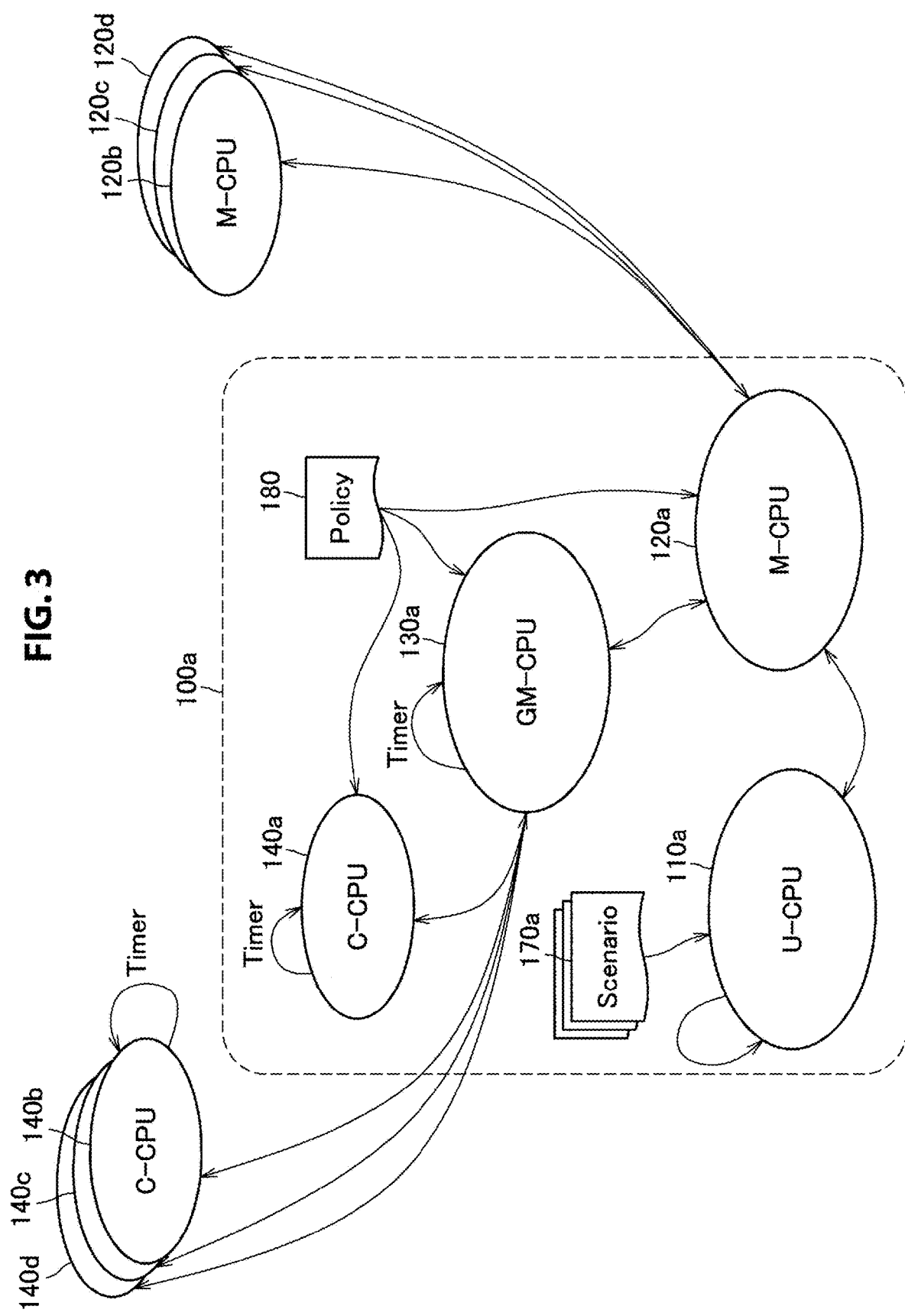
FIG. 3 is an explanatory diagram illustrating tasks.

FIG. 3 is an explanatory diagram illustrating a task of the U-CPU 110a, the M-CPU 120a, the GM-CPU 130a, and the C-CPU 140a included in the battery server 100a according to the embodiment of the present disclosure.

The U-CPU 110a refers to the scenario 170a on a periodic basis by a timer and determines whether the state of the battery server 100a (e.g., SOC of the battery 160a) satisfies a condition defined in the scenario 170a. If the state of the battery server 100a (e.g., SOC of the battery 160a) satisfies the condition defined in the scenario 170a, the U-CPU 110a requests the M-CPU 120a to receive power.

If the M-CPU 120a receives the request of power reception from the U-CPU 110a, the M-CPU 120a arbitrates the right to control transmission and reception of direct-current power between the M-CPU 120a and other M-CPUs 120b to 120d. In addition, when there is any request for receiving power in other battery servers 100b to 100d, the M-CPU 120a similarly arbitrates the right to control transmission and reception of direct-current power between the M-CPU 120a and other M-CPUs 120b to 120d.

The battery server 100a is assumed to obtain the control right as a result of the arbitration. The M-CPU 120a starts the GM-CPU 130a to activate the GM-CPU 130a. In addition, the M-CPU 120a notifies the C-CPU 140a of identification information for identifying the GM-CPU 130a. The activated GM-CPU 130a refers to the policy 180 and notifies the C-CPUs 140a to 140d of information used to transmit and receive power on a periodic basis by a timer.

The C-CPU 140a controls the DC-to-DC converter 150a on the basis of the notification from a GM-CPU (GM-CPU 130a in this example) having the identification information that the M-CPU 120a has notified of, and performs the transmission and reception of power over the direct-current bus line 20. The C-CPU 140a refers to a parameter of the DC-to-DC converter 150a to check whether an abnormality has occurred on a periodic basis by a timer.

If there is an abnormality in the DC-to-DC converter 150a, the C-CPU 140a notifies the GM-CPU 130a of the occurrence of abnormality in the DC-to-DC converter 150a. In addition, the C-CPU 140a checks the presence or absence of the notification from the GM-CPU 130 on a periodic basis by a timer. If the notification from the GM-CPU 130a does not occur for a predetermined time or more, the C-CPU 140a notifies the GM-CPU 130a that the notification from the GM-CPU 130a does not occur for a predetermined time or more. The C-CPU 140a may stop the DC-to-DC converter 150a from transmitting and receiving direct-current power after the C-CPU 140a notifies the GM-CPU 130a that the notification from the GM-CPU 130a does not occur for a predetermined time or more.

The U-CPU 110a, the M-CPU 120a, the GM-CPU 130a, and the C-CPU 140a included in the battery server 100a according to the embodiment of the present disclosure perform the respective tasks as illustrated in FIG. 3, and thus it is possible to keep the order of targets to be controlled among the battery servers.

Figure 4:
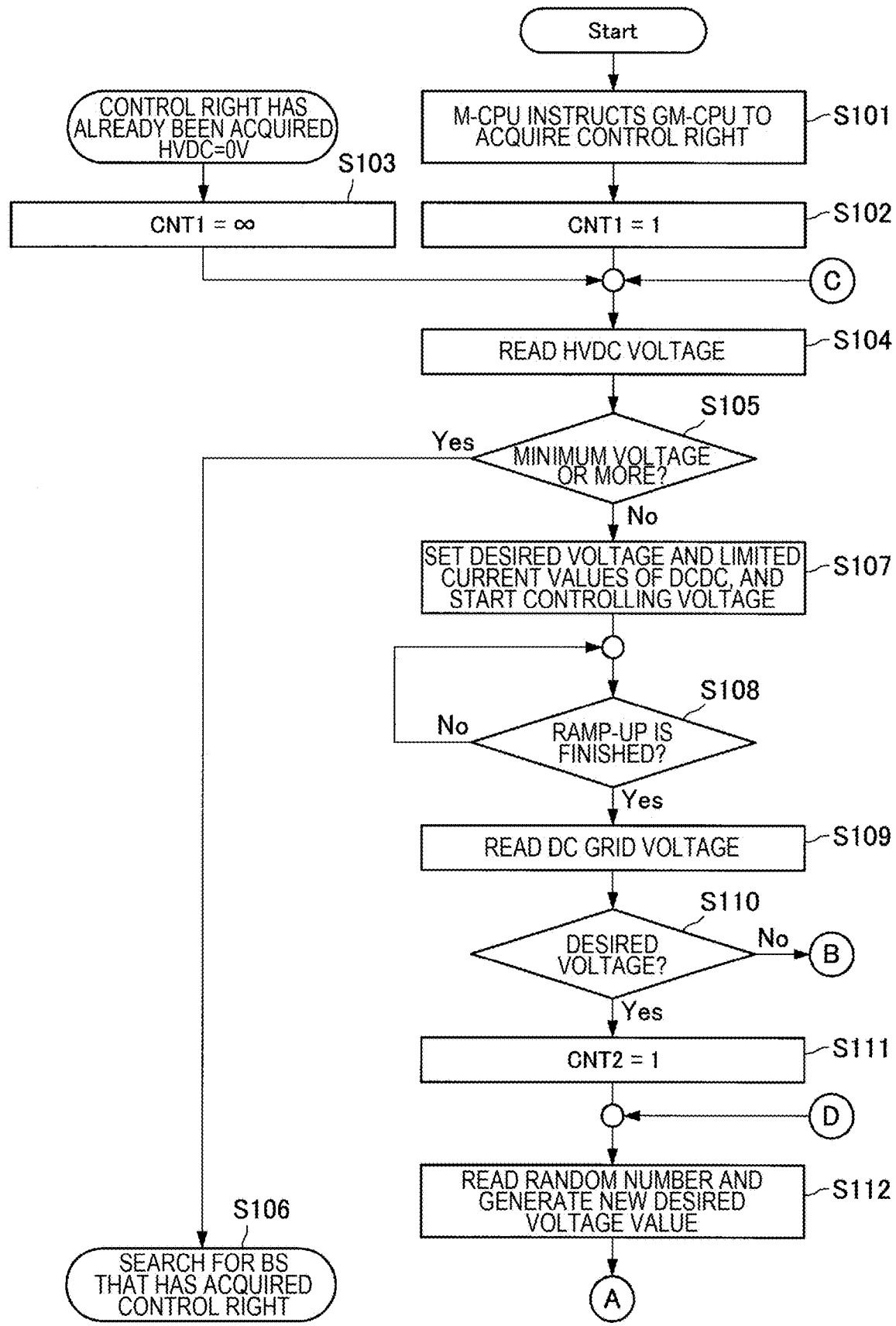
Figure 5:
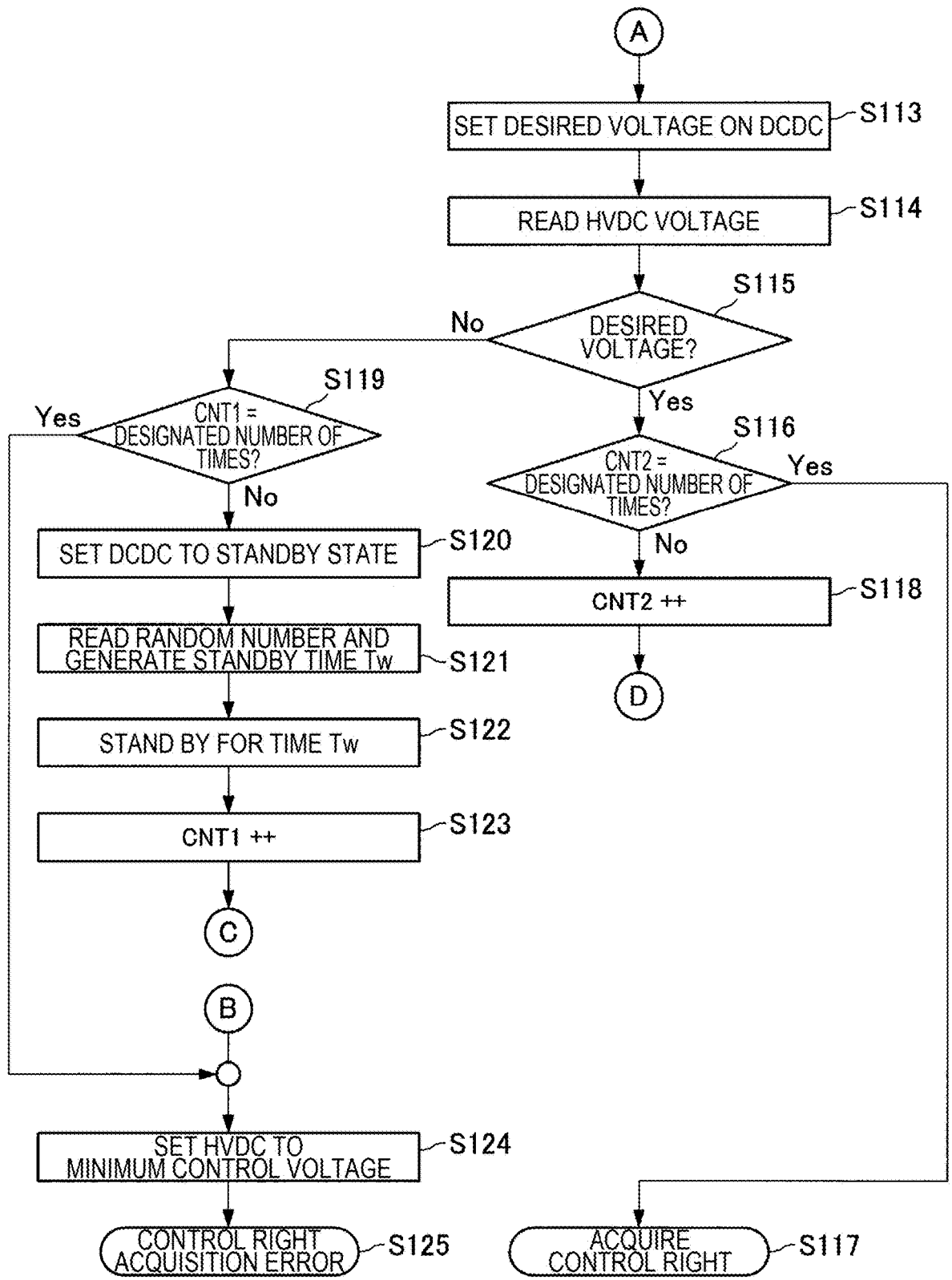

Next, an operation example of the battery server 100a according to the embodiment of the present disclosure will be described. FIG. 4 and FIG. 5 are each a flowchart illustrating the operation example of the battery server 100a according to the embodiment of the present disclosure. FIG. 4 and FIG. 5 illustrate an operation example of the battery server 100a for checking whether there is another battery server trying to acquire the control right by setting voltage of the direct-current bus line 20 in the case of trying to acquire the control right through arbitration conducted by the M-CPU 120a or in the case where the control right has already been acquired. Hereinafter, with reference to FIG. 4 and FIG. 5, the operation example of the battery server 100a according to the embodiment of the present disclosure will be described.

In the case where the direct-current bus line 20 is connected to a device, which is not authorized for connection or is not intended to be connected thereto, the device is not under the control of a battery server acquiring the control right, and thus it is considered that a situation occurs where the device transmits/receives power to/from the direct-current bus line 20 without any permission or transmits a control command to other battery servers without being asked for it, thereby throwing the DC grid into confusion.

Therefore, the battery server according to the embodiment conduct arbitration between the battery server and the other battery servers to acquire the control right. In the case where acquisition of the control right is allowed through the arbitration, the battery server sets voltage to the direct-current bus line 20 to determine whether the acquisition of the control right has actually succeeded. If there is a conflict between the voltage set to the direct-current bus line 20 and an actual voltage of the direct-current bus line 20 (in other words, if these voltages does not match with each other), the battery server determines that another battery server is controlling the voltage to the direct-current bus line 20.

In the case of trying to acquire the control right of the direct-current bus line 20 through arbitration conducted by the M-CPU 120a, the battery server 100a first instructs the GM-CPU 130a to acquire the control right through the M-CPU 120a (Step S101). When the GM-CPU 130a receives the control right acquisition instruction from the M-CPU 120a, the GM-CPU 130a sets the counter CNT1 to 1 (Step S102). The counter CNT1 is a counter configured to count the number of executions of a series of checking processes.

Next, when the counter CNT1 is set to 1, the GM-CPU 130a instructs the C-CPU 140a to read a voltage value of the direct-current bus line 20 via the DC-to-DC converter 150a (Step S104). From a result of reading the voltage value of the direct-current bus line 20, the GM-CPU 130a determines whether the voltage value of the direct-current bus line 20 is a predetermined minimum voltage or more (Step S105).

In the case where the voltage value of the direct-current bus line 20 is the predetermined minimum voltage or more (Yes in Step S105), it is determined that there is another battery server that has acquired the control right of the direct-current bus line 20, and the GM-CPU 130a notifies the M-CPU 120a that there is the another battery server that has acquired the control right of the direct-current bus line 20. On the basis of the notification from the GM-CPU 130a, the M-CPU 120a searches for the another battery server that has acquired the control right (Step S106).

On the other hand, in the case where the voltage value of the direct-current bus line 20 is less than the predetermined minimum voltage (No in Step S105), the GM-CPU 130a sets predetermined desired voltage and current values of the DC-to-DC converter 150a through the C-CPU 140a, and starts controlling the DC-to-DC converter 150a (Step S107). Specifically, the GM-CPU 130a causes the DC-to-DC converter 150a to gradually ramp up the voltage value of the direct-current bus line 20 to the desired voltage through the C-CPU 140a.

The GM-CPU 130a stands by until the ramp-up performed by the DC-to-DC converter 150a finishes (Step S108). When the ramp-up finishes, the GM-CPU 130a causes the DC-to-DC converter 150a to read a voltage value of the direct-current bus line 20 through the C-CPU 140a (Step S109).

Next, the GM-CPU 130a determines whether the voltage value of the direct-current bus line 20 after the ramp-up finishes is the desired voltage (Step S110). If the voltage value of the direct-current bus line 20 after the ramp-up finishes is the desired value (Yes in Step S110), the GM-CPU 130a sets a counter CNT2 to 1 (Step S111). The counter CNT2 is a counter configured to count the number of execution of a voltage resetting process after the voltage of the direct-current bus line 20 becomes the desired voltage.

Next, when the counter CNT2 is set to 1, the GM-CPU 130a causes the C-CPU 140a to read a random number generated by the random number generator 190a. The C-CPU 140a generates a new desired voltage value to be set on the direct-current bus line 20 by using the random number generated by the random number generator 190a (Step S112).

When the new desired voltage value to be set on the direct-current bus line 20 is generated, the C-CPU 140a sets the desired voltage value on the DC-to-DC converter 150a (Step S113). When the DC-to-DC converter 150a sets voltage to the direct-current bus line 20 on the basis of the desired voltage, the C-CPU 140a causes the DC-to-DC converter 150a to read a voltage value of the direct-current bus line 20 (Step S114). Subsequently, the C-CPU 140a determines whether the voltage value of the direct-current bus line 20 is the desired voltage set in Step S113 described above (Step S115).

When the voltage value of the direct-current bus line 20 is the desired voltage set in Step S113 described above (Yes in Step S115), the C-CPU 140a notifies the GM-CPU 130a that the voltage value of the direct-current bus line 20 is the desired voltage set in Step S113 described above. Next, the GM-CPU 130a that has received the notification determines whether a value of the counter CNT2 is a designated number of times (Step S116).

If the value of the counter CNT2 is the designated number of times (Yes in Step S116), the GM-CPU 130a determines that the battery server 100a has acquired the control right without any problem (Step S117). In other words, in the case where it is possible to set the voltage value based on the randomly set desired voltage to the direct-current bus line 20 a designated number of times, the GM-CPU 130a determines that the battery server 100a has acquired the control right without any problem. When it is determined that the battery server 100a has acquired the control right without any problem, the GM-CPU 130a notifies the M-CPU 102a that the battery server 100a has acquired the control right without any problem. The M-CPU 120 notifies other battery servers of the acquisition of the control right without any problem.

On the other hand, if the value of the counter CNT2 is not the designated number of times (No in Step S116), the GM-CPU 130a increments the counter CNT2 by one (Step S118). The GM-CPU 130a returns to the process in Step S112 described above after the counter CNT2 is incremented by one.

Next, a case will be described where the voltage value of the direct-current bus line 20 is not the desired voltage set in Step S113 described above. When the voltage value of the direct-current bus line 20 is not the desired voltage set in Step S113 described above (No in Step S115), the C-CPU 140a notifies the GM-CPU 130a that the voltage value of the direct-current bus line 20 is not the desired voltage set in Step S113 described above. Next, the GM-CPU 130a that has received the notification determines whether a value of the counter CNT1 is a designated number of times (Step S119). If the value of the counter CNT1 is not the designated number of times (No in Step S119), the GM-CPU 130a instructs the C-CPU 140a to set the DC-to-DC converter 150a to a standby state.

The C-CPU 140a that has received the instruction sets the DC-to-DC converter 150a to the standby state (Step S120). Next, when the DC-to-DC converter 150a is set to the standby state, the C-CPU 140a reads the random number generated by the random number generator 190a and generates a standby time Tw on the basis of the random number (Step S121).

When the standby time Tw is generated in Step S121 described above, the C-CPU 140a notifies the GM-CPU 130a of the generated standby time Tw, for example. The GM-CPU 130a stands by for the standby time Tw (Step S122), and increments the value of the counter CNT1 by one (Step S123). When the value of the counter CNT1 is incremented by one, the GM-CPU 130a returns to the process in Step S104 described above.

On the other hand, if the value of the counter CNT1 is the designated number of times (Yes in Step S119), the GM-CPU 130a instructs the C-CPU 140a to set the direct-current bus line 20 to minimum control voltage (Step S124), and determines that the battery server 100a has failed to acquire the control right due to an error (Step S125). In other words, in the case where the series of checking processes has failed a designated number of times, the GM-CPU 130a determines that the battery server 100a has failed to acquire the control right.

In addition, in the case where the voltage value of the direct-current bus line 20 after the ramp-up finishes is not the desired value in Step S110 (No in Step S110), the GM-CPU 130a also instructs the C-CPU 140a to set the direct-current bus line 20 to minimum control voltage (Step S124), and determines that the battery server 100a has failed to acquire the control right due to an error (Step S125).

Note that, it is also assumed that the battery server 100a has already acquired the control right but voltage is not set to the direct-current bus line 20. In this case, the battery server 100a set the counter CNT1 to infinity (Step S103). Since the counter CNT1 is set to infinity, it is possible for the battery server 100a to continue the series of processes illustrated in FIG. 4 and FIG. 5. When the battery server 100a continues the series of processes illustrated in FIG. 4 and FIG. 5, it is possible to prevent the other battery servers from acquiring the control right of the direct-current bus line 20. This is because the other battery servers can never acquire the control right of the direct-current bus line 20 and are forced to give up the acquisition of the control right eventually.

In the case where it is determined that the acquisition of the control right has failed due to an error, it is possible for the battery server 100a to notify the other battery servers of the failure. In addition, it is also possible for the battery server 100a to output the failure as characters, an image, sound, or the like in the case where it is determined that the acquisition of the control right has failed due to an error.

Note that, information on the designated number of times on each of the counters may be described in a policy 180 common to all the battery servers 100a to 100d. Since the information on the designated number of times of each of the counters is described in the policy 180, all the battery servers operates in the same way with regard to checking of acquisition of the control right.

Note that, in the case where it is determined that the acquisition of the control right has failed due to an error, it is possible for the battery server 100a to execute the above described series of processes again. This is because sometimes the control right can be acquired successfully by executing the processes again even if once an error has occurred.

With reference to FIG. 4 and FIG. 5, the operation example of the battery server 100a according to the embodiment of the present disclosure has been described above. Next, an example of the operation of the battery server 100a according to the embodiment of the present disclosure will be described in detail.

Figure 6:
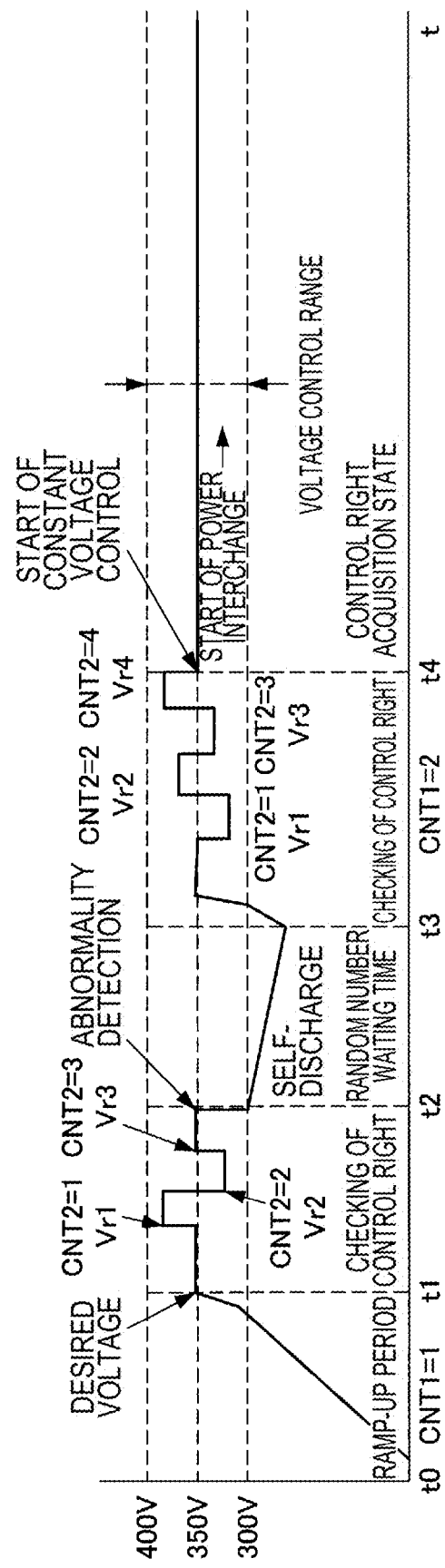

FIG. 6 is an explanatory diagram illustrating an example of detailed operation of the battery server 100a according to the embodiment of the present disclosure. FIG. 6 is a graph of time series variation in voltage that illustrates specific operation of the battery server 100a operating on the basis of the flowcharts in FIG. 4 and FIG. 5.

A time t0 in FIG. 6 is a time point when the GM-CPU 130a sets predetermined desired voltage and current values of the DC-to-DC converter 150a through the C-CPU 140a, and starts controlling the DC-to-DC converter 150a in Step S107 in FIG. 4. A time period from the time t0 to a time t1 in FIG. 6 is a ramp-up period. In this time period, the counter CNT1 is 1. FIG. 6 is an example of the case where the desired voltage is 350 V.

If the ramp-up period ends and the desired voltage is obtained at the time t1, a period from the time t1 to a time t2 becomes a control right check period subsequently. In other words, the period from the time t1 to time t2 is a period in which the C-CPU 140a generates a new desired voltage value to be set on the direct-current bus line 20 by using a random number read from the random number generator 190a, sets the desired voltage to the DC-to-DC converter 150a, and checks whether the control right is acquired by reading a voltage value of the direct-current bus line 20. In addition, FIG. 6 is an example of the case where a voltage is controlled in a range from 300 V to 400 V. In other words, a value of the desired voltage based on a random number falls within a range from 300 V to 400 V.

In the example illustrated in FIG. 6, it is determined that the control right is acquired when a desired voltage value generated by using a random number matches with a voltage value of the direct-current bus line 20 four times. In other words, a process of checking whether a desired voltage value matches with a voltage value of the direct-current bus line 20 is repeated until the counter CNT2 becomes 4.

However, in the example illustrated in FIG. 6, the C-CPU 140a detects abnormality in a third process between the time t1 and time t2. In other words, a desired voltage value does not match with a voltage value of the direct-current bus line 20. Therefore, the C-CPU 140a reads a random number generated by the random number generator 190a and generates a standby time Tw on the basis of the random number. In the example in FIG. 6, the period from the time t2 to time t3 is the standby time. In the standby time, voltage of the direct-current bus line 20 gradually decreases through self-discharge.

When the standby time expires, the GM-CPU 130a ramps up again to the desired voltage and then shifts to the control right checking period. In FIG. 6, a desired voltage value generated by using a random number matches with a voltage value of the direct-current bus line 20 four times. Therefore, the GM-CPU 130a terminates the control right checking period at a time t4, and starts constant voltage control on the DC-to-DC converter 150a.

By executing the above described series of operation, the battery server 100a according to the embodiment of the present disclosure surely checks whether there is not another battery server that is controlling the direct-current bus line 20 after acquiring the control right through arbitration between the own battery server and the other battery servers. It is possible for the battery server 100a to surely check whether there is not another battery server that is controlling the direct-current bus line 20 after acquiring the control right. Accordingly, it is possible to safely operate the DC grid.

2. Conclusion

As described above, according to an embodiment of the present disclosure, there is provided a power transmission and reception control system 1 that performs transmission and reception of direct-current power between a plurality of battery servers over a direct-current bus line connected to the battery servers. In addition, according to an embodiment of the present disclosure, there are provided battery servers 100a to 100d in which only one battery server is allowed to have the control right and is allowed to control transmission and reception of direct-current power to and from other battery servers over the direct-current bus line 20.

The battery servers 100a to 100d according to the embodiment of the present disclosure are configured to have functions divided into four tasks. Accordingly, an instruction is prevented from being sent directly from a lower task (task of requesting power to be received) to an upper task (task of controlling DC-to-DC converter).

The battery servers 100a to 100d according to the embodiment of the present disclosure can avoid situations caused when the roles are simply shared between a master and a slave as described above and can efficiently manage a control right for controlling the transmission and reception of direct-current power. In addition, the battery servers 100a to 100d according to the embodiment of the present disclosure efficiently manages the right to control the transmission and reception of direct-current power, thereby keeping the order of targets to be controlled among the battery servers.

In addition, the battery server 100a according to the embodiment of the present disclosure surely checks whether there is not another battery server that is controlling the direct-current bus line 20 but that does not take part in the arbitration after the battery server 100a acquires the control right through arbitration between the battery server 100a and the other battery servers. It is possible for the battery server 100a to surely check whether there is another device that is controlling the direct-current bus line 20 after the battery server 100a acquires the control right. Accordingly, it is possible for the battery server 100a to safely operate the DC grid.

Steps in processes executed by devices in this specification are not necessarily executed chronologically in the order described in the sequence chart or the flowchart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to those of structures in the above-described devices. Furthermore, it is possible to provide a recording medium having the computer program recorded thereon. Moreover, the hardware configuration of each function block illustrated in functional block diagrams allows the series of processes to be implemented in hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above described embodiment, the battery server 100 determines whether it is possible to acquire the control right of the direct-current bus line 20 by setting voltage to the direct-current bus line 20 and checking the voltage. In addition, it is possible to check pressure and a flow rate of fluid such as gas or tap water, intensity and frequency of radio waves, intensity and color of light, and the like by applying the above described embodiment.

For example, the pressure and the flow rate of fluid can be checked by connecting areas corresponding to the battery servers 100 according to the embodiments through a pipe or a hose that conveys the fluid, controlling the pressure of an area such that the pressure is changed a predetermined number of times by using a random number, and checking that the flow rate does not change from start of output with respect to each pressure. As described above, it is possible to control interchange of the fluid through a certain area acquiring the control right, by controlling the pressure through the certain area and checking that the flow rate does not change at this time.

For example, the intensity and frequency of radio waves can be checked by checking that no radio wave is transmitted among areas corresponding to the battery servers 100 according to the embodiment, transmitting a radio wave from a certain area, changing frequency of the radio wave by using a random number a predetermined number of times, and checking that intensity of the radio waves of the respective frequencies does not change from the initial transmission. As described above, it is possible to apply the present technology to remote ropot security in a poor visibility area, for example, by transmitting a radio wave from a certain area, changing frequency of the radio wave, and checking that intensity of the radio wave does not change.

For example, the intensity and color of light can be checked by checking that no light is transmitted among areas corresponding to the battery servers 100 according to the embodiment, radiating light from a certain area, changing color of the light by using a random number a predetermined number of times, and checking that intensity of the light of each of the colors does not change from the initial radiation. As described above, it is possible to apply the present technology to teamwork such as monitoring using mobile terminals provided with imaging devices, for example, by radiating light from a certain area, changing color of the light, and checking that intensity of the light does not change.

Figure 7:
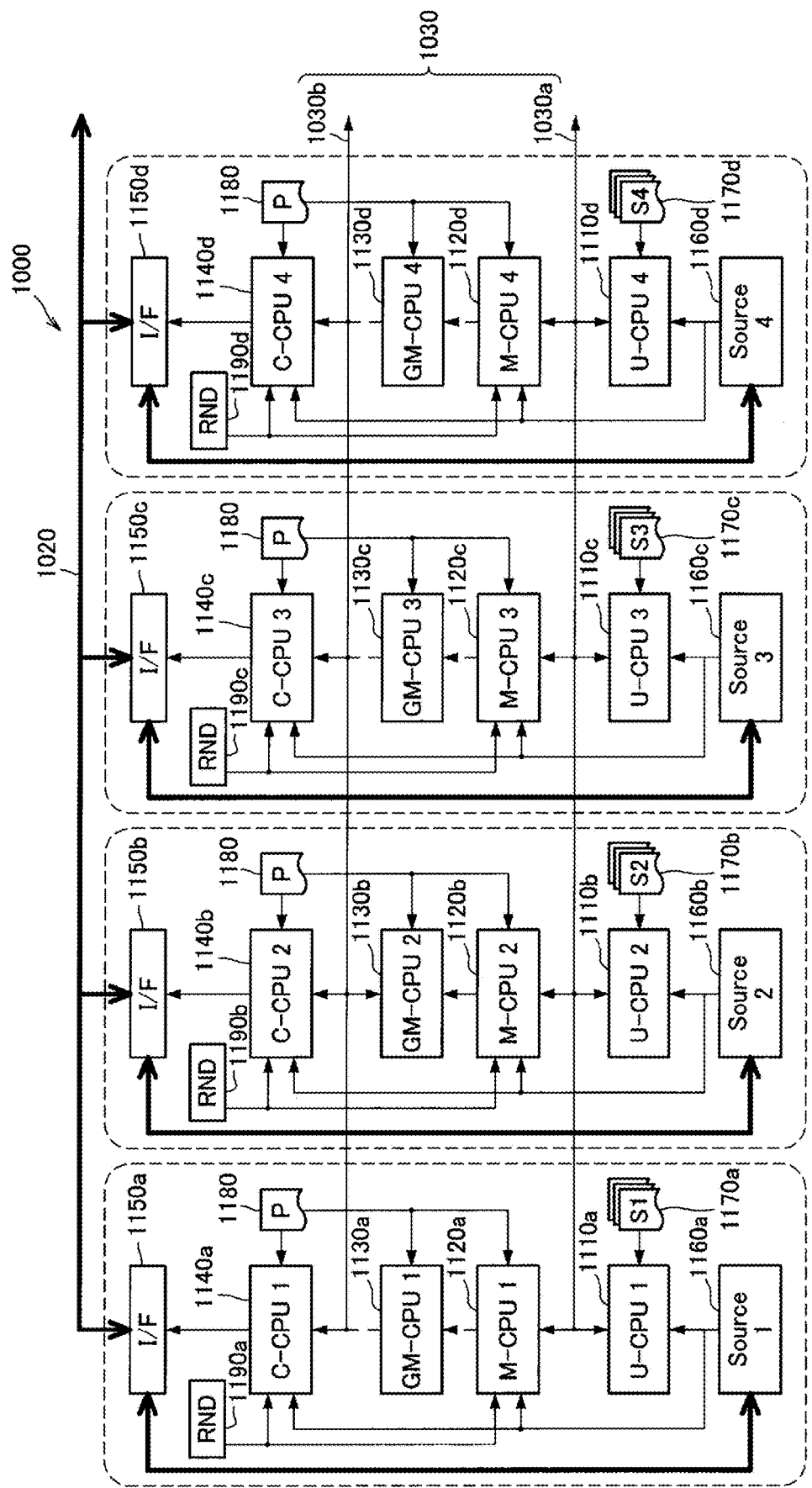
FIG. 7 is an explanatory diagram illustrating a functional configuration example of an input and output control system according to an embodiment of the present disclosure.

FIG. 7 is an explanatory diagram illustrating a functional configuration example of an input and output control system according to the embodiment of the present disclosure. FIG. 7 illustrates the input and output control system that applies the configuration of the power transmission and reception control system illustrated in FIG. 2 to input and output of something other than the power, such as fluid (gas, tap water, or the like), radio waves, or light. Hereinafter, with reference to FIG. 7, the functional configuration example of the input and output control system 1000 according to the embodiment of the present disclosure will be described.

As illustrated in FIG. 7, the input and output control system 1000 may be constituted by four input and output control devices 1100a to 1100d. Needless to say, the number of input and output control devices is not limited to the example illustrated in FIG. 7. The input and output control device 1100a includes a U-CPU 1110a, an M-CPU 1120a, a GM-CPU 1130a, a C-CPU 1140a, and interface (I/F) 1150a, a source 1160a input/output through a medium 1020, and a random number generator (RND) 1190a. The source 1160a input/output through the medium 1020 may be direct-current power, fluid such as gas or tap water, a transmission source of a radio wave, a transmission source of light, or the like.

The input and output control device 1100a to 1100d are connected through a communication wire 1030. The communication wire 1030 is divided into two paths (channels) including a communication wire 1030a and a communication wire 1030b. The communication wires 1030a and 1030b may be physically different wired communication wires, or may be physically identical wired or wireless communication wires, which may be different from each other logically in authentication, encryption, or the like. In addition, as illustrated in FIG. 7, the communication wire 1030a allows the U-CPU 1110a to communicate with other U-CPUs 1110b to 1110d, and the M-CPU 1120a to communicate with other M-CPUs 1120b to 1120d. The communication wire 1030b allows the GM-CPU 1130a to communicate with other GM-CPUs 1130*b* to 1130*d*, and the C-CPU 1140*a* to communicate with other C-CPUs 1140*b* to 1140*d*.

The U-CPU 1110*a* operates in accordance with a scenario 170*a* unique to the input and output control device 1100*a*. The M-CPU 1120*a*, the GM-CPU 1130*a*, and the C-CPU 1140*a* operate in accordance with a policy 1180 common to all the input and output control devices 1100*a* to 1100*d*. These operations are similar to the above described operation of the battery servers 100*a* to 100*d*.

The C-CPU 1140*a* is an example of the input and output control unit according to the present disclosure. The C-CPU 1140*a* controls input and output of the source 1160*a* through the medium 1020 common among the own input and output control device 1100*a* and the other input and output control devices 1100*b* to 1100*d*. The GM-CPU 1130*a* is an example of the input and output management unit according to the present disclosure. The GM-CPU 1130*a* requests the C-CPU 1140*a* to control input and output of the source 1160*a* through the medium 1020. The M-CPU 1120*a* is an example of the input and output arbitration unit according to the present disclosure. The M-CPU 1120*a* requests the GM-CPU 1130*a* to control input and output of the source 1160*a* through the C-CPU 1140*a*.

The C-CPU 1140*a* decides a value related to the source set on the medium 1020 (such as pressure, intensity of radio wave, or intensity of light) by using a random number generated by the random number generator 1190*a*. Subsequently, if the setting of the decided value related to the source on the medium 1020 has succeeded, the C-CPU 1140*a* determines that there is not another device that is setting another value on the medium 1020 or inputting/outputting the source, and notifies the GM-CPU 1130*a* thereof. Alternatively, in the case where it is recognized that another input and output control device is trying to acquire the control right at the same timing, the M-CPU 1120*a* sets a standby time by using a random number generated by the random number generator 1190*a*, and starts the control right acquisition process again after the standby time has elapsed.

The input and output control system 1000 according to the embodiment of the present disclosure has the configuration illustrated in FIG. 7. This enables only one of the input and output control devices connected to the common medium 1020 to surely acquire the control right and control input and output of the source through the common medium 1020.

In addition, since the input and output control device 1100*a* to 1100*d* constituting the input and output control system according to the embodiment of the present disclosure have the configuration illustrated in FIG. 7, it is possible to check whether there is another device that is setting input/output of a source with respect to the medium 1020 or actually inputting/outputting the source. Since the input and output control device 1100*a* to 1100*d* have the configuration illustrated in FIG. 7, it is possible to surely check whether there is no another input and output control device controlling input/output of the source to the medium 1020 after the control right is acquired. This enables safe input/output of the source through the medium 1020.

In addition, the effects described in the present specification are merely illustrative and demonstrative, and not limitative. In other words, the technology according to the present disclosure can exhibit other effects that are evident to those skilled in the art along with or instead of the effects based on the present specification.

The present technology may be configured as below.

(1)

A power transmission and reception control device including:

a power transmission and reception control unit configured to control transmission and reception of direct-current power over a direct-current power line through a DC-to-DC converter connected to the direct-current power line;

a power transmission and reception management unit configured to request the power transmission and reception control unit to control the DC-to-DC converter; and a power transmission and reception arbitration unit configured to request the power transmission and reception management unit to perform transmission and reception of power through the DC-to-DC converter, in which, when the power transmission and reception arbitration unit instructs the power transmission and reception management unit to set voltage to the direct-current power line, the power transmission and reception management unit causes the power transmission and reception control unit to set the voltage to the direct-current power line a predetermined number of times by using a random number, and if voltage and current of the direct-current power line are in predetermined ranges, the power transmission and reception management unit instructs the power transmission and reception arbitration unit to acquire a control right of the direct-current power line.

(2)

The power transmission and reception control device according to (1), in which, in the case where the voltage and the current of the direct-current power line are not in the predetermined ranges, the power transmission and reception management unit sets predetermined standby time by using a random number, and after the standby time has elapsed, the power transmission and reception management unit causes the power transmission and reception control unit to set voltage to the direct-current power line.

(3)

The power transmission and reception control device according to (1) or (2), in which the power transmission and reception management unit uses a random number generated by an authentic random number generator.

(4)

The power transmission and reception control device according to any of (1) to (3), in which the power transmission and reception management unit uses a random number generated on the basis of information unique to the power transmission and reception control device.

(5)

The power transmission and reception control device according to any of (1) to (4), in which, when the power transmission and reception management unit notifies the power transmission and reception arbitration unit that the acquisition of the control right has failed, the power transmission and reception arbitration unit instructs the power transmission and reception management unit to set voltage to the direct-current power line again.

(6)

The power transmission and reception control device according to any of (1) to (5), in which the power transmission and reception control unit and the power transmission and reception management unit communicate with another power transmission and reception control device through a first communication channel.

(7)

The power transmission and reception control device according to (6), in which the power transmission and reception arbitration unit communicates with another power transmission and reception control device through a second communication channel that is different from the first communication channel, and arbitrates the acquisition of the control right between the power transmission and reception control device and the another power transmission and reception control device in advance through the second communication channel.

(8)

The power transmission and reception control device according to any of (1) to (7), in which the power transmission and reception control unit controls charge and discharge of a secondary battery through the DC-to-DC converter, the secondary battery being connected to the DC-to-DC converter.

(9)

The power transmission and reception control device according to any of (1) to (7), in which the power transmission and reception control unit, the power transmission and reception management unit, and the power transmission and reception arbitration unit operate on the basis of policy information that is common with all of the other power transmission and reception control devices.

(10)

A power transmission and reception control method including:

instructing to set voltage to a direct-current power line;

causing a DC-to-DC converter connected to the direct-current power line to set voltage to the direct-current power line a predetermined number of times in response to the instruction by using a random number; and instructing to acquire a control right of the direct-current power line if voltage and current of the direct-current power line are in predetermined ranges.

(11)

A computer program causing a computer to execute:

instructing to set voltage to a direct-current power line;

causing a DC-to-DC converter connected to the direct-current power line to set voltage to the direct-current power line a predetermined number of times in response to the instruction by using a random number; and instructing to acquire a control right of the direct-current power line if voltage and current of the direct-current power line are in predetermined ranges.

(12)

An input and output control device including:

an input and output control unit configured to control input/output of a predetermined target through a medium common with another area;

an input and output management unit configured to request the input and output control unit to control input/output of the predetermined target from/to the common medium; and an input and output arbitration unit configured to request the input and output management unit to perform input/output through the input and output control unit, in which, when the input and output arbitration unit instructs the input and output management unit to set output of the predetermined target to the common medium, the input and output management unit causes the input and output control unit to output the predetermined target to the common medium a predetermined number of times by using a random number, and if the predetermined target output to the common medium is a value set at the time of the output, the input and output management unit instructs the input and output arbitration unit to acquire a control right of input/output of the predetermined target from/to the common medium.

(13)

The input and output control device according to (12), in which the common medium is a direct-current power line, and the predetermined target is direct-current power.

(14)

The input and output control device according to (12), in which the common medium is a pipe that conveys fluid, and the predetermined target is the liquid or gas.

(15)

The input and output control device according to (12)

in which the common medium is air, and the predetermined target is an electromagnetic wave.

(16)

The input and output control device according to (15), in which the predetermined target is a radio wave or light.

REFERENCE SIGNS LIST 1 power transmission and reception control system
20 direct-current bus line
21a to 21d local bus line
100a to 100d battery server

The invention claimed is:

1. A power transmission and reception control device comprising:
    a power transmission and reception control unit configured to control transmission and reception of direct-current power over a direct-current power line through a DC-to-DC converter connected to the direct-current power line;
    a power transmission and reception management unit configured to request the power transmission and reception control unit to control the DC-to-DC converter; and
    a power transmission and reception arbitration unit configured to request the power transmission and reception management unit to perform transmission and reception of power through the DC-to-DC converter,
    wherein, when the power transmission and reception arbitration unit instructs the power transmission and reception management unit to set voltage to the direct-current power line, the power transmission and reception management unit causes the power transmission and reception control unit to set the voltage to the direct-current power line a predetermined number of times by using a random number, and if voltage and current of the direct-current power line are set values, the power transmission and reception management unit instructs the power transmission and reception arbitration unit to acquire a control right of the direct-current power line.

2. The power transmission and reception control device according to claim 1,
    wherein, in the case where the voltage and the current of the direct-current power line are not the set values, the power transmission and reception management unit sets predetermined standby time by using a random number, and after the standby time has elapsed, the power transmission and reception management unit causes the power transmission and reception control unit to set voltage to the direct-current power line.

3. The power transmission and reception control device according to claim 1,
wherein the power transmission and reception management unit uses a random number generated by an authentic random number generator.

4. The power transmission and reception control device according to claim 1,
wherein the power transmission and reception management unit uses a random number generated on the basis of information unique to the power transmission and reception control device.

5. The power transmission and reception control device according to claim 1,
wherein, when the power transmission and reception management unit notifies the power transmission and reception arbitration unit that the acquisition of the control right has failed, the power transmission and reception arbitration unit instructs the power transmission and reception management unit to set voltage to the direct-current power line again.

6. The power transmission and reception control device according to claim 1,
wherein the power transmission and reception control unit and the power transmission and reception management unit communicate with another power transmission and reception control device through a first communication channel.

7. The power transmission and reception control device according to claim 6,
wherein the power transmission and reception arbitration unit communicates with another power transmission and reception control device through a second communication channel that is different from the first communication channel, and arbitrates the acquisition of the control right between the power transmission and reception control device and the another power transmission and reception control device in advance through the second communication channel.

8. The power transmission and reception control device according to claim 1,
wherein the power transmission and reception control unit controls charge and discharge of a secondary battery through the DC-to-DC converter, the secondary battery being connected to the DC-to-DC converter.

9. The power transmission and reception control device according to claim 1,
wherein the power transmission and reception control unit, the power transmission and reception management unit, and the power transmission and reception arbitration unit operate on the basis of policy information that is common with all of the other power transmission and reception control devices.

10. A power transmission and reception control method comprising:
instructing to set voltage to a direct-current power line;
causing a DC-to-DC converter connected to the direct-current power line to set voltage to the direct-current power line a predetermined number of times in response to the instruction by using a random number; and
instructing to acquire a control right of the direct-current power line if voltage and current of the direct-current power line are set values.

11. A computer program causing a computer to execute:
instructing to set voltage to a direct-current power line;
causing a DC-to-DC converter connected to the direct-current power line to set voltage to the direct-current power line a predetermined number of times in response to the instruction by using a random number; and
instructing to acquire a control right of the direct-current power line if voltage and current of the direct-current power line are set values.

* * * * *